United States Patent
Araujo Da Silva et al.

(10) Patent No.: US 8,763,660 B2
(45) Date of Patent: Jul. 1, 2014

(54) TIRE BELT INCORPORATING AN ANTIOXIDANT AGENT

(75) Inventors: Jose Carlos Araujo Da Silva, Pont-du-Chateau (FR); Pierre-Antoine Niore, Moigny-sur-Ecole (FR); Arnaud Remy, Orleat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 820 days.

(21) Appl. No.: 12/297,809

(22) PCT Filed: Apr. 20, 2007

(86) PCT No.: PCT/EP2007/003474
§ 371 (c)(1),
(2), (4) Date: Feb. 24, 2009

(87) PCT Pub. No.: WO2007/121936
PCT Pub. Date: Nov. 1, 2007

(65) Prior Publication Data
US 2009/0165919 A1    Jul. 2, 2009

(30) Foreign Application Priority Data
Apr. 20, 2006    (FR) ..................... 06 03638

(51) Int. Cl.
*B60C 9/18*    (2006.01)
*B29D 30/00*   (2006.01)
*C07C 211/54*  (2006.01)
*C08F 136/08*  (2006.01)
*C08K 5/18*    (2006.01)

(52) U.S. Cl.
USPC ............ 152/237; 524/722; 524/571; 564/434

(58) Field of Classification Search
USPC .................... 524/722, 571; 564/434; 152/237
See application file for complete search history.

(56) References Cited

U.S. PATENT DOCUMENTS

| 3,277,174 | A  | * | 10/1966 | Wheeler | ................. 564/434 |
| 2001/0031836 | A1 |   | 10/2001 | Datta |   |
| 2004/0129360 | A1 | * | 7/2004 | Vidal | ................. 152/537 |

FOREIGN PATENT DOCUMENTS

FR    1 354 536 A    3/1964

* cited by examiner

*Primary Examiner* — Satya Sastri
(74) *Attorney, Agent, or Firm* — Dickinson Wright PLLC

(57) ABSTRACT

Tire belt comprising a rubber composition based on at least one isoprene elastomer, a reinforcing filler, a crosslinking system and an antioxidant agent, characterized in that said antioxidant agent comprises a 4,4'-bis(alkylamino)triphenylamine corresponding to the formula (I):

in which $R^1$ and $R^2$, which are identical or different, each represent a linear or branched alkyl group having from 1 to 12 carbon atoms or a cycloalkyl group having from 5 to 8 carbon atoms. Such an antioxidant gives the belt of the invention a better long-term resistance to fatigue and to crack propagation.

18 Claims, 2 Drawing Sheets

TIRE BELT INCORPORATING AN ANTIOXIDANT AGENT

The present invention relates to tyres and to the crown reinforcements of these tyres, also known as "belts".

More particularly, it relates to the diene elastomer compositions used to form all or part of the rubbery matrix of such reinforcements, and also to the antioxidant agents used for the anti-ageing protection of such compositions.

It will briefly be recalled that a tyre having a radial carcass reinforcement comprises, in a known manner, a tread, two inextensible beads, two sidewalls joining the beads to the tread and a belt placed circumferentially between the carcass reinforcement and the tread, this belt consisting of various plies (or "layers") of rubber which may or may not be reinforced by reinforcing elements (or "reinforcements") such as cords or monofilaments, of the metal or textile type.

The tyre belt generally consists of at least two superposed belt layers or plies, sometimes known as "working" plies or "crossed" plies, the reinforcements of which are in practice arranged parallel to one another within a layer, but crossed from one layer to the other, that is to say inclined, whether symmetrically or not, to the median circumferential plane, by an angle which is generally between 10° and 45° depending on the type of tyre in question. Each of these two crossed layers consists of a rubber matrix generally based on isoprene, sometimes known as "calendering gum" that coats the reinforcements. The crossed layers may be finished off by various other auxiliary rubber plies or layers, having widths that vary depending on the case, and which may or may not contain reinforcements; mention will be made by way of example of simple rubber pads, of layers known as "protective" layers, the role of which is to protect the rest of the belt from external attack, perforations, or else layers known as "hoop reinforcement" layers comprising reinforcements oriented substantially along the circumferential direction (layers known as "zero degree" layers), whether they are radially external or internal compared to the crossed layers.

This tyre belt must meet, in a known manner, mmerous, sometimes contradictory, requirements, in particular:
(i) to be as rigid as possible at low deformation, as it substantially contributes to stiffening the tyre crown;
(ii) to have as low a hysteresis as possible, to on the one hand, minimise overheating of the internal zone of the crown when rolling and, on the other hand, to reduce the rolling resistance of the tyre, which is synonymous with fuel economy; and
(iii) finally to have a high endurance, in particular with respect to the phenomenon of separation or cracking of the ends of the crossed layers in the "shoulder" zone of the tyre, a problem which is known by the term "cleavage".

The third condition especially requires that rubber compositions incorporated into the formation of tyre belts have a very high resistance to crack propagation and to thermal oxidation, in particular achieved due to the use of antioxidant agents that offer an effective anti-ageing protection.

This requirement is particularly high for the tyre covers of heavy vehicles, which are designed to be able to be retreaded one or more times when the treads that they comprise reach a critical degree of wear after prolonged rolling.

The antioxidants used for a very long time as anti-ageing protective agents in rubber compositions for tyres, especially in the belts of such tyres, belong to the family of the derivatives of p-phenylenediamine (PPD) such as for example N-isopropyl-N'-phenyl-p-phenylenediamine (I-PPD) or N-1,3-dimethylbutyl-N'-phenyl-p-phenylenediamine (6-PPD) which are simultaneously excellent antioxidants and antiozonants (see, for example, Applications WO 2004/033548, WO 2005/063510, WO 2005/133666).

Now, the Applicants have discovered during their research that the use of a different antioxidant agent, which to date has not been used in tyres, makes it possible to further increase the long-term resistance to fatigue and to crack propagation of tyre belts.

Consequently, a first subject of the invention relates to a tyre belt comprising a rubber composition based on at least one isoprene elastomer, a reinforcing filler, a crosslinking system and an antioxidant agent, characterized in that said antioxidant agent comprises a 4,4'-bis(alkylamino)triphenylamine corresponding to the formula (I):

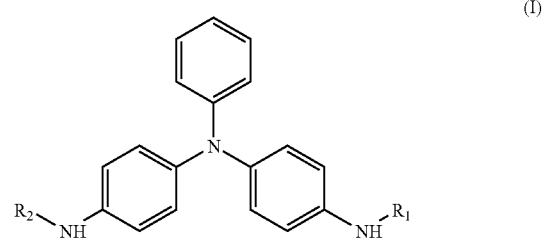

in which $R^1$ and $R^2$, which are identical or different, each represent a linear or branched alkyl group having from 1 to 12 carbon atoms or a cycloalkyl group having from 5 to 8 carbon atoms.

The invention thus offers the crown reinforcements of the tyres, and also these tyres themselves, a novel and particularly advantageous overall compromise of properties.

The invention also relates to any tyre comprising a belt according to the invention, in particular whether this tyre is of radial or non-radial type.

The tyres of the invention are particularly intended to equip motor vehicles of the following types: passenger vehicles, SUVs (sport utility vehicles), two-wheel vehicles (especially motorcycles), aircraft, for instance industrial vehicles chosen from vans, "heavy" vehicles—i.e. underground trains, buses, road transport vehicles (lorries, tractors, trailers), off-road vehicles such as agricultural or civil engineering machines—, and other transport or handling vehicles.

Another subject of the invention is the use of a belt according to the invention for manufacturing new tyres or for retreading worn tyres, most particularly in the case of heavy vehicle tyres.

The belts according to the invention are prepared by a process which constitutes another subject of the present invention, said process comprising the following steps:
incorporating into an isoprene elastomer, in a mixer:
  a reinforcing filler; and
  an antioxidant agent,
by thermomechanically kneading the entire mixture, in one or more stages, until a maximum temperature between 110° C. and 190° C. is reached;
cooling the entire mixture to a temperature below 100° C.;
then incorporating a crosslinking system;
kneading the entire mixture up to a maximum temperature below 110° C.;
calendering or extruding the composition thus obtained in the form of a layer of rubber; and
incorporating this layer, after optional addition of textile or metallic reinforcements, into the tyre belt, and characterized in that said antioxidant agent comprises a 4,4'-bis(alkylamino)triphenylamine corresponding to the formula (I) above.

The invention also relates, in itself, to the use of a compound of aforementioned formula (I) for the anti-ageing protection of a tyre belt.

BRIEF DESCRIPTION OF THE DRAWINGS

The invention and also its advantages will be easily understood in the light of the description and of the exemplary embodiments which follow, and also the schematic figures relating to these examples which represent a radial cross section of a heavy vehicle tyre with radial carcass reinforcement (FIG. 1) and also a reaction scheme for synthesis of a compound of formula (I) suitable for the tyre belt of the invention (FIG. 2).

I. MEASUREMENTS AND TESTS USED

Figure 1:
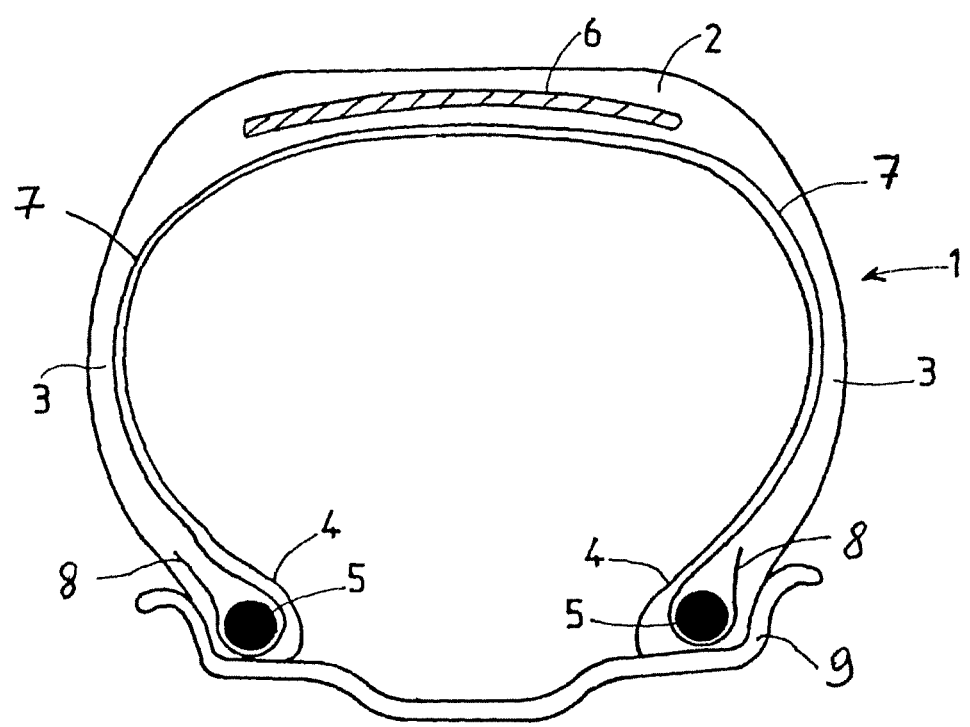

The rubber compositions are characterized before and after curing, as indicated below.

A) Mooney Plasticity:

An oscillating consistometer such as described in French standard NF T 43-005 (1991) is used. The Mooney plasticity is measured according to the following principle: the composition in the green state (i.e., before curing) is moulded in a cylindrical chamber heated at 100° C. After preheating for one minute, the rotor rotates within the test specimen at 2 rpm and the working torque for maintaining this movement is measured after rotating for 4 minutes. The Mooney plasticity (ML 1+4) is expressed in "Mooney units" (MU, with 1 MU=0.83 N.m).

B) Rheometry:

The measurements are carried out at 150° C. with an oscillating-chamber rheometer according to the standard DIN 53529—part 3 (June 1983). The change in the rheometric torque as a function of time describes the change in the stiffening of the composition following the vulcanisation reaction. The measurements are processed according to the standard DIN 53529—part 2 (March 1983): $t_i$ is the induction time, that is to say the time necessary for the start of the vulcanisation reaction; $t_\alpha$ (for example, $t_{99}$) is the time necessary to attain a conversion of $\alpha$ %, that is to say $\alpha$ % (for example, 99%) of the difference between the minimum and maximum torques. Also measured is the $1^{st}$ order conversion rate constant denoted by K (expressed in $min^{-1}$), calculated between 30% and 80% conversion, which makes it possible to assess the vulcanisation kinetics.

C) Tensile Tests:

These tests make it possible to determine the elasticity stresses and the properties at break. Unless indicated otherwise, they are carried out in accordance with French standard NF T 46-002 of September 1988. The "nominal" secant moduli (or apparent stresses, in MPa) or "true" secant moduli (relative in this case to the actual cross section of the test piece) at 10% elongation (denoted respectively by MA10 and E10), 100% elongation (respectively MA100 and E100) and 300% elongation (respectively MA300 and E300) are measured in a second elongation (i.e. after an accommodation cycle). All these tensile measurements are carried out under normal temperature (23±2° C.) and hygrometry (50±5% relative humidity) conditions, according to the French standard NF T 40-101 (December 1979). Also measured are the tensile strength (in MPa) and the elongations at break (in %), at a temperature of 23° C.

D) "MFTRA" Test:

The resistance to fatigue and to the propagation of notches (with prior initiation), expressed as the number of cycles or in relative units (u.r.) is measured in a known manner on a test piece comprising a 1 mm notch and subjected to repeated tensile tests of low frequency up to an elongation of 20%, using a Monsanto ("MFTR" type) machine, until the test piece breaks, according to the French standard NF T 46-021.

The above test is carried out after an accelerated thermal oxidative ageing of 26 days, the composition sample tested being placed in a ventilated oven kept at a temperature of 80° C. and under an ambient humidity of 40%.

II. DETAILED DESCRIPTION OF THE INVENTION

The tyre belts of the invention have the main characteristic of incorporating, into all or part of their rubbery matrix, at least one elastomeric composition based on at least each of the following constituents: (i) an (at least one) isoprene elastomer; (ii) a (at least one) reinforcing filler; (iii) a crosslinking system; and (iv) a (at least one) compound of formula (I) as an antioxidant agent.

Of course, the expression "composition based on" should be understood to mean a composition comprising the in situ reaction product and/or mixture of the various constituents used, some of these base constituents being capable of, or intended to, react together, at least partly, during the various manufacturing phases of the rubber compositions, belts and tyres, in particular during their vulcanisation.

In the present description, unless expressly indicated otherwise, all the percentages (%) indicated are % by weight.

II-1. Diene Elastomer

The term "diene" elastomer (or rubber, the two being considered to be synonymous) is understood to mean, generally, an elastomer derived at least in part (i.e., a homopolymer or a copolymer) from diene monomers, that is to say from monomers bearing two (conjugated or unconjugated) carbon-carbon double bonds.

This general definition being given, the expression "isoprene elastomer" is understood, in the present application, to mean an isoprene homopolymer or copolymer, in other words a diene elastomer chosen from the group composed of natural rubber (NR), synthetic polyisoprenes (IRs), various isoprene copolymers and blends of these elastomers. Among the isoprene copolymers, mention will in particular be made of the isobutene/isoprene (butyl rubber —IIR), isoprene/styrene (SIR), isoprene/butadiene (BIR) or isoprene/butadiene/styrene (SBIR) copolymers.

The isoprene elastomer is preferably natural rubber or a synthetic cis-1,4-polyisoprene. Among these synthetic polyisoprenes, preferably use is made of polyisoprenes having a content (molar %) of cis-1,4 bonds greater than 90%, more preferably still greater than 98%.

By blending (i.e. mixing) with the isoprene elastomer above, the compositions of the invention may contain diene elastomers other than isoprene elastomers, preferably in a minority (i.e. less than 50 phr). The isoprene elastomer more preferably represents 75 to 100% by weight of all the diene elastomers, i.e. 75 to 100 phr (parts by weight per hundred parts of rubber).

As such diene elastomers other than isoprene elastomers, mention will especially be made of any diene elastomer of the unsaturated type chosen, in particular, from the group composed of polybutadienes (BRs), in particular cis-1,4 or 1,2-syndiotactic polybutadienes and those having a content of 1,2-units between 4% and 80%, and butadiene copolymers, especially styrene/butadiene (SBR) copolymers, and in particular those having a styrene content between 5 and 50% by weight and more particularly between 20% and 40% by weight, a content of 1,2-bonds of the butadiene part between 4% and 65%, a content of trans-1,4 bonds between 30% and 80%, styrene/butadiene/isoprene (SBIR) copolymers, and blends of these various elastomers (BR, SBR and SBIR).

By way of example, when the belt of the invention is intended for a tyre of the passenger vehicle type, if such a blend is used, it is preferably a mixture of SBR and of BR which is used as a blend with natural rubber, preferably to a limit of less than 25% by weight (or less than 25 phr) of SBR and BR mixture.

The belt of the invention is particularly intended for a heavy vehicle tyre, whether this is a new tyre or a worn tyre (in the case of retreading). In such a case, the isoprene elastomer is preferably used alone, that is to say without blending with another diene elastomer or polymer. More preferably still, this isoprene elastomer is exclusively natural rubber.

II-2. Reinforcing Filler

It is possible to use any type of reinforcing filler known for its abilities to reinforce a rubber composition that can be used for manufacturing tyres, for example an organic filler such as carbon black, or else an inorganic reinforcing filler such as silica, with which a coupling agent must be associated.

As carbon blacks, all the carbon blacks are suitable, especially the blacks of the HAF, ISAF, SAF type conventionally used in tyres (known as tyre-grade blacks). Among the latter, mention will more particularly be made of the reinforcing carbon blacks of the 100, 200 or 300 series (ASTM grades), such as for example the blacks N115, N134, N234, N326, N330, N339, N347, N375, or else, depending on the targeted applications, the blacks of higher series (for example, N660, N683, N772). The carbon blacks could be, for example, already incorporated into the isoprene elastomer in the form of a masterbatch (see, for example, Applications WO 97/36724 or WO 99/16600).

The expression "inorganic reinforcing filler" should be understood, in the present application, to mean, by definition, any inorganic or mineral filler (regardless of its colour and its origin (natural or synthetic)), also known as a "white" filler, "clear" filler or even a "non-black filler" as opposed to carbon black, capable of reinforcing, by itself without any means other than an intermediate coupling agent, a rubber composition intended for manufacturing tyres, in other words capable of replacing, in its reinforcing role, a conventional tyre-grade carbon black; such a filler is generally characterized, in a known manner, by the presence of hydroxyl (—OH) groups at its surface.

Suitable inorganic reinforcing fillers are especially mineral fillers of the siliceous type, in particular silica ($SiO_2$) or of the aluminous type, in particular alumina ($Al_2O_3$). The silica used may be any reinforcing silica known to a person skilled in the art, especially any precipitated or fumed silica having a BET surface area and also a CTAB specific surface area that are both below 450 $m^2/g$, preferably from 30 to 400 $m^2/g$. As highly dispersible (known as "HD") precipitated silicas, mention will be made, for example, of the silicas Ultrasil 7000 and Ultrasil 7005 from Degussa, the silicas Zeosil 1.165 MP, 1135 MP and 1115 MP from Rhodia, the silica Hi-Sil EZ150G from PPG, the silicas Zeopol 8715, 8745 and 8755 from Huber, and the silicas having a high specific surface area such as described in Application WO 03/16837.

When the compositions of the invention are intended for tyre treads having low rolling resistance, the inorganic reinforcing filler used, in particular when this is silica, preferably has a BET surface area between 45 and 400 $m^2/g$, more preferably between 60 and 300 $m^2/g$.

Preferably, the total reinforcing filler content (carbon black, inorganic reinforcing filler or mixture of these two types of filler) is between 20 and 200 phr, more preferably between 30 and 150 phr, the optimum being, in a known manner, different depending on the particular applications targeted.

In order to couple the inorganic reinforcing filler to the diene elastomer, use is made, in a known manner, of an at least bifunctional coupling agent (or bonding agent) intended to provide a sufficient connection, of chemical and/or physical nature, between the inorganic filler (surface of its particles) and the diene elastomer, in particular bifunctional organosilanes or polyorganosiloxanes.

Use is especially made of polysulphide silanes, said to be "symmetrical" or "asymmetrical" depending on their particular structure, such as described, for example, in Applications WO 03/002648 and WO 03/002649.

Particularly suitable, without the definition below being limiting, are polysulphide silanes said to be "symmetrical" corresponding to the following general formula:

n is an integer from 2 to 8 (preferably from 2 to 5);

A is a divalent hydrocarbon-based radical (preferably $C_1$-$C_{18}$ alkylene groups or $C_6$-$C_{12}$ arylene groups, more particularly $C_1$-$C_{10}$, especially $C_1$-$C_4$, alkylenes, in particular propylene); and Z corresponds to one of the formulae below:

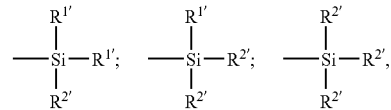

in which:

the $R^{1'}$ radicals, which are substituted or unsubstituted, and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, especially $C_1$-$C_4$ alkyl groups, more particularly methyl and/or ethyl); and the $R^{2'}$ radicals, which are substituted or unsubstituted and identical to or different from one another, represent a $C_1$-$C_{18}$ alkoxy or $C_5$-$C_{18}$ cycloalkoxy group (preferably a group chosen from $C_1$-$C_8$ alkoxy and $C_5$-$C_8$ cycloalkoxy groups, more preferably still a group chosen from $C_1$-$C_4$ alkoxy groups, in particular methoxy and ethoxy groups).

In the case of a mixture of polysulphide alkoxysilanes corresponding to the formula above, especially the usual commercially available mixtures, the average value of "n" is a fraction preferably between 2 and 5, more preferably close to 4. But the invention may also advantageously be carried out, for example, with disulphide alkoxysilanes (n=2).

As examples of polysulphide silanes, mention will more particularly be made of polysulphides (especially disulphides, trisulphides or tetrasulphides) of bis(($C_1$-$C_4$)alkoxy ($C_1$-$C_4$)alkylsilyl ($C_1$-$C_4$)alkyl) such as for example the polysulphides of bis(3-trimethoxy-silylpropyl) or of bis(3-triethoxysilylpropyl). Among these compounds, use is made, in particular, of bis(3-triethoxysilylpropyl) tetrasulphide, abbreviated to TESPT, of formula $[(C_2H_5O)_3Si(CH_2)_3S_2]_2$ or bis(triethoxysilylpropyl)disulphide, abbreviated to TESPD, of formula $[(C_2H_5O)_3Si(CH_2)_3S]_2$. Mention will also be made, as preferred examples, of the polysulphides (especially disulphides, trisulphides or tetrasulphides) of bis(mono($C_1$-$C_4$)alkoxydi($C_1$-$C_4$)alkyl-silylpropyl), more particularly bis(monoethoxydimethyl-silylpropyl)tetrasulphide as described in Patent Application WO 02/083782.

As a coupling agent other than a polysulphide alkoxy silane, mention will especially be made of bifunctional POSs (polyorganosiloxanes) or else of hydroxysilane polysulphides ($R^{2'}$=OH in the formula above) as described in Patent Applications WO 02/30939 and WO 02/31041.

In the rubber compositions according to the invention, the content of coupling agent is preferably between 4 and 12 phr, more preferably between 3 and 8 phr.

The coupling agent could be pregrafted to the diene elastomer or to the inorganic reinforcing filler. It is preferred however, especially for reasons of better processing of the compositions in the green state, to use the coupling agent either grafted to the inorganic reinforcing filler, or in the free state (i.e. ungrafted).

Finally, a person skilled in the art will understand that, as a filler equivalent to the inorganic reinforcing filler described in the present section, a reinforcing filler of another nature, especially of organic nature, could be used as long as this reinforcing filler is covered with an inorganic layer such as silica, or else comprises, at its surface, functional sites, especially hydroxyl sites, requiring the use of a coupling agent to establish the bond between the filler and the elastomer.

II-3. Antioxidant Agent

The tyre belts of the invention have the main feature of comprising, as an antioxidant agent, a 4,4'-bis(alkylamino) triphenylamine corresponding to the formula (I):

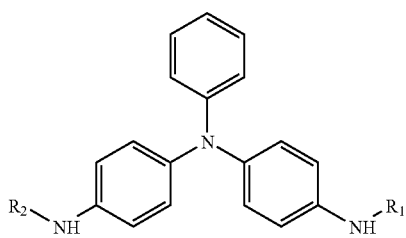

(I)

in which $R^1$ and $R^2$, which are identical or different, each represent a linear or branched alkyl group having from 1 to 12 carbon atoms or a cycloalkyl group having from 5 to 8 carbon atoms.

Preferably, $R^1$ and $R^2$, which are identical or different, each represent an alkyl group having from 2 to 8 carbon atoms, preferably chosen from the group composed of ethyl, propyl, (i.e. n-propyl, iso-propyl), butyl (i.e. n-butyl, sec-butyl and tert-butyl), pentyl, hexyl, heptyl and octyl groups, or a cycloalkyl group having from 5 to 8 carbon atoms (a cyclopentyl, cyclohexyl, cycloheptyl or cyclooctyl group), more preferably a cyclohexyl group.

Among the compounds of formula (I) above, use is more preferably made of a compound for which the $R^1$ and $R^2$ groups are branched, of formula (II) below:

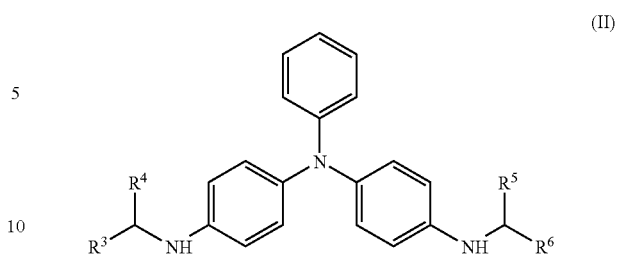

(II)

in which $R^3$, $R^4$, $R^5$ and $R^6$, which are identical or different, each represent an alkyl group for which the number of carbon atoms conforms to the preferred definitions given above for $R^1$ and $R^2$.

Compounds corresponding to the generic formulae (I) and (II) above are known as antiozonants or antioxidants for rubber; some have, for example, been described, and also their synthesis, in U.S. Pat. No. 3,277,174. No application in isoprene elastomer compositions for tyres, a fortiori in the belts of said tyres, has been envisaged.

As more preferred examples of branched $R^1$ and $R^2$ radicals, mention will, in particular, be made of isopropyl (a), 1,3-dimethylbutyl (b) and 1,4-dimethylpentyl (c) radicals of formulae below:

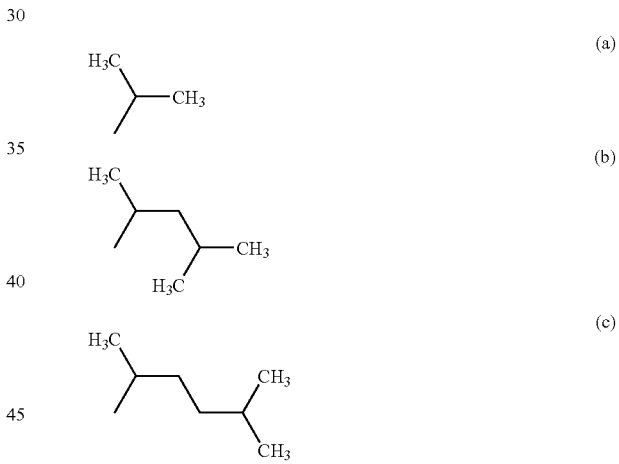

Thus, according to one particularly preferred embodiment of the invention, the tyre belt of the invention uses, as an antioxidant, one of the following compounds:

4,4'-bis(isopropylamino)triphenylamine corresponding to the specific formula:

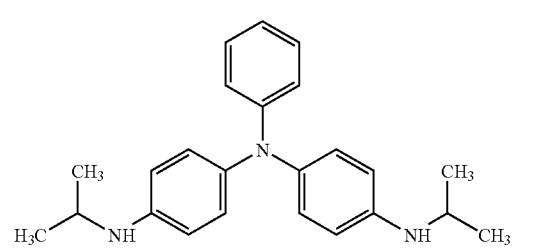

(III-a)

4,4'-bis(1,3-dimethylbutylamino)triphenylamine corresponding to the formula:

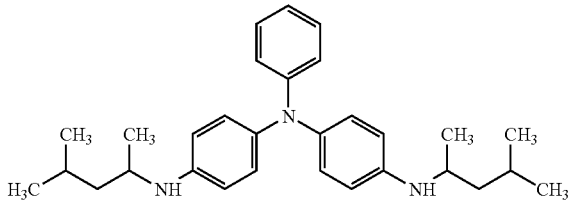

(III-b)

4,4'-bis(1,4-dimethylpentylamino)triphenylamine corresponding to the formula:

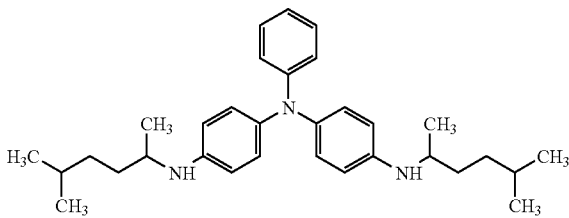

(III-c)

In the isoprene rubber composition forming part of the tyre belt according to the invention, the antioxidant content of formulae (I), (II) or (III) is preferably between 1 and 10 phr. Below the minimum indicated, the endurance may prove to be insufficient whereas above the maximum recommended, there is a risk of degradation of the mechanical properties due to an unwanted plasticizing effect.

For all these reasons, this antioxidant content is more preferably between 2 and 8 phr, in particular between 2 and 6 phr.

II-4. Various Additives

The rubber matrices of the belts according to the invention may also comprise all or some of the customary additives used in rubber compositions intended for manufacturing tyre belts, such as for example extending oils, plasticizers, anti-ageing protective agents other than those mentioned above, such as anti-ozone agents, other chemical antiozonants or antioxidants, anti-fatigue agents, acceptors and donors of methylene, bismaleimides or other reinforcing resins, a crosslinking system based either on sulphur, or on sulphur and/or peroxide donors, vulcanization accelerators, vulcanization activators or retarders, systems for promoting the adhesion of the rubber to metal such as, for example, metallic complexes or salts (for example containing cobalt, boron, phosphorus, or else lanthanide salts such as described in the aforementioned Application WO 2005/133666).

The isoprene matrices may also contain, in addition to optional coupling agents for inorganic reinforcing fillers, agents for covering these inorganic fillers, or more generally processing aids capable of, in a known manner, owing to an improvement in the dispersion of the filler in the rubber matrix and to a reduction in the viscosity of the compositions, improving their processability.

II-5. Belts and Tyres According to the Invention

The isoprene compositions described previously are intended to form all or part of the rubbery matrix of the belt of a tyre, in particular of a tyre for a heavy vehicle or a passenger vehicle.

They can, for example, be used as a rubber gum for calendering a belt layer or ply of cord fabric, whether this is a "crossed" layer, a protective layer or a layer for hoop reinforcement (at zero degrees), or they are intended to form a simple pad, band or strip of rubber gum, free of reinforcements, positioned radially on top of or underneath the various aforementioned belt layers, or even inserted between the latter, for example to form a sublayer of the tread, or else placed at the lateral ends of these belt layers, in the "shoulder" zones of the tyre, for example to form decoupling rubber gums.

By way of example, the appended FIG. 1 schematically represents a radial cross section of a heavy vehicle tyre 1 having radial carcass reinforcement which may or may not conform to the invention, in this general representation. This tyre 1 comprises a crown 2, two sidewalls 3, two beads 4, a radial carcass reinforcement 7 extending from one bead to the other. The crown 2, topped with a tread (not represented in this very schematic figure, for simplification) is, in a known manner, reinforced by a belt 6 composed of at least two "crossed" crown layers, covered with at least one crown protection layer, all these layers being reinforced by metallic cords made of carbon steel. The carcass reinforcement 7 is wound around two bead wires 5 in each bead 4, the upturn 8 of this reinforcement 7 being, for example, directed towards the outside of the tyre 1 which is shown here mounted on its rim 9. The carcass reinforcement 7 is made up of at least one ply or layer reinforced with metallic cords known as "radial" cords, that is to say that these cords are arranged practically parallel to one another and extend from one bead to the other so as to form an angle of between 80° and 90° with the median circumferential plane (the plane perpendicular to the axis of rotation of the tyre which is located half-way between the two beads 4 and passes through the middle of the belt 6).

The tyre according to the invention from the above example has the main feature of comprising, in its crown 2, a belt 6 according to the invention, the isoprene composition based on the compound of formula (I) constituting the rubber gum for calendering the belt layers 6 (two crossed layers and one protective layer, in this example).

In the case of a tyre comprising, for example, one or more "zero degree" layers, it is preferred that the rubber gum for calendering the corded fabric, whether it is in the form of a layer having a certain width, close to the width of the crossed layers, in the form of narrower strips, or even in the form of a single rubber-sheathed wire, is also based on an isoprene composition comprising the compound of formula (I).

According to one preferred embodiment of the invention, the rubber composition based on the isoprene elastomer, the reinforcing filler and the antioxidant of formula (I) has, in the vulcanized state (i.e. after curing), a secant modulus in extension (E10) which is greater than 5 MPa, more preferably between 7 and 20 MPa. It is in the moduli ranges indicated above that the best endurance compromise is recorded.

II-6. Preparation of the Rubber Compositions

The rubber compositions are manufactured in suitable mixers, using two successive preparation stages well known to a person skilled in the art: a first stage of thermomechanical working or kneading (sometimes referred to as a "non-productive" stage) at high temperature, up to a maximum temperature (denoted by $T_{max}$) between 110° C. and 190° C., preferably between 130° C. and 180° C., followed by a second stage of mechanical working (sometimes referred to as a "productive" stage) at a lower temperature, typically below 110° C., for example between 40° C. and 100° C., during which finishing stage the crosslinking or vulcanization system is incorporated.

The process for manufacturing tyre belts according to the invention is characterized in that at least the reinforcing filler and the compound of formula (I) are incorporated by kneading into the isoprene elastomer during the first non-productive stage, that is to say that at least these various base constituents are introduced into the mixer and are thermomechanically kneaded, in one or more steps, until a maximum temperature between 110° C. and 190° C., preferably between 130° C. and 180° C., is reached.

By way of example, the first (non-productive) stage is carried out in a single thermomechanical step during which the following are introduced into a suitable mixer such as a conventional internal mixer: firstly all the necessary base constituents (isoprene elastomer, reinforcing filler and compound of formula (I)), then secondly, for example after kneading for one to two minutes, the optional complementary processing aids and other various additives, apart from the crosslinking or vulcanization system. The total kneading time, in this non-productive stage, is preferably between 2 and 10 minutes.

After cooling the mixture thus obtained, the vulcanization system is then incorporated at low temperature, generally in an external mixer such as a roll mill; the whole mixture is then blended (productive stage) for a few minutes, for example between 5 and 15 minutes.

The final composition thus obtained is then calendered, for example in the form of sheets (thickness of 2 to 3 mm) or of thin films of rubber in order to measure its physical or mechanical properties, especially for laboratory characterization, or else extruded to form a rubber profile that can be used directly, after cutting or assembling to the targeted dimensions, and after adding the desired textile or metallic reinforcements, such as a belt layer.

In summary, the process according to the invention, for preparing a tyre belt according to the invention, comprising a rubber composition based on at least one isoprene elastomer, a reinforcing filler, a crosslinking system and an antioxidant agent, comprises the following steps:
  incorporating into an isoprene elastomer, in a mixer:
    a reinforcing filler; and
    an antioxidant agent,
  by thermomechanically kneading the entire mixture, in one or more stages, until a maximum temperature between 110° C. and 190° C. is reached;
  cooling the entire mixture to a temperature below 100° C.; then incorporating a crosslinking system;
  kneading the entire mixture up to a maximum temperature below 110° C.;
  calendering or extruding the composition thus obtained in the form of a layer of rubber; and
  incorporating this layer, after optional addition of textile or metallic reinforcements, into the tyre belt,
and it is characterized in that said antioxidant agent comprises a 4,4'-bis(alkylamino)triphenylamine corresponding to the aforementioned formula (I).

The vulcanization or curing is carried out in a known manner at a temperature preferably between 130° C. and 200° C. and under pressure, for a sufficient time which may vary, for example, between 5 and 90 min depending, in particular, on the curing temperature, the vulcanization system used, the vulcanization kinetics and the size of the tyre in question.

The crosslinking system itself is preferably based on sulphur and on a primary vulcanization accelerator, in particular a sulphenamide type accelerator. Added to this vulcanization system, incorporated during the first non-productive stage and/or during the productive stage, are various known secondary accelerators or vulcanization activators such as zinc oxide, stearic acid, guanidine derivatives (in particular, diphenylguanidine), vulcanization retarders, etc. Sulphur is used in an amount preferably between 1 and 10 phr, more preferably between 2 and 8 phr, especially when the invention is applied to a heavy vehicle type tyre. The primary vulcanization accelerator is used in an amount preferably between 0.5 and 5 phr, more preferably between 0.5 and 2 phr.

It is possible to use, as a (primary or secondary) accelerator any compound capable of acting as a vulcanization accelerator for diene elastomers in the presence of sulphur, especially accelerators of the thiazole type and also derivatives thereof, accelerators of the thiuram or zinc dithiocarbamate type. These accelerators are more preferably chosen from the group composed of 2-mercaptobenzothiazyl disulphide (abbreviated to MBTS), N-cyclohexyl-2-benzothiazyl sulphenamide (abbreviated to CBS), N,N-dicyclohexyl-2-benzothiazyl sulphenamide (abbreviated to DCBS), N-tert-butyl-2-benzothiazyl sulphenamide (abbreviated to TBBS), N-tert-butyl-2-benzothiazyl sulphenamide (abbreviated to TBSI), zinc dibenzyldithiocarbamate (abbreviated to ZBEC) and mixtures of these compounds. Preferably, a primary accelerator of the sulphenamide type is used.

It goes without saying that the invention relates to the belts and tyres described previously both in the "green" state (i.e. before curing) and in the "cured" or vulcanized state (i.e. after crosslinking or vulcanization).

III. EXEMPLARY EMBODIMENTS

III-1. Synthesis of 4,4'-bis(1,3-dimethylbutylamino)-triphenylamine

Figure 2:
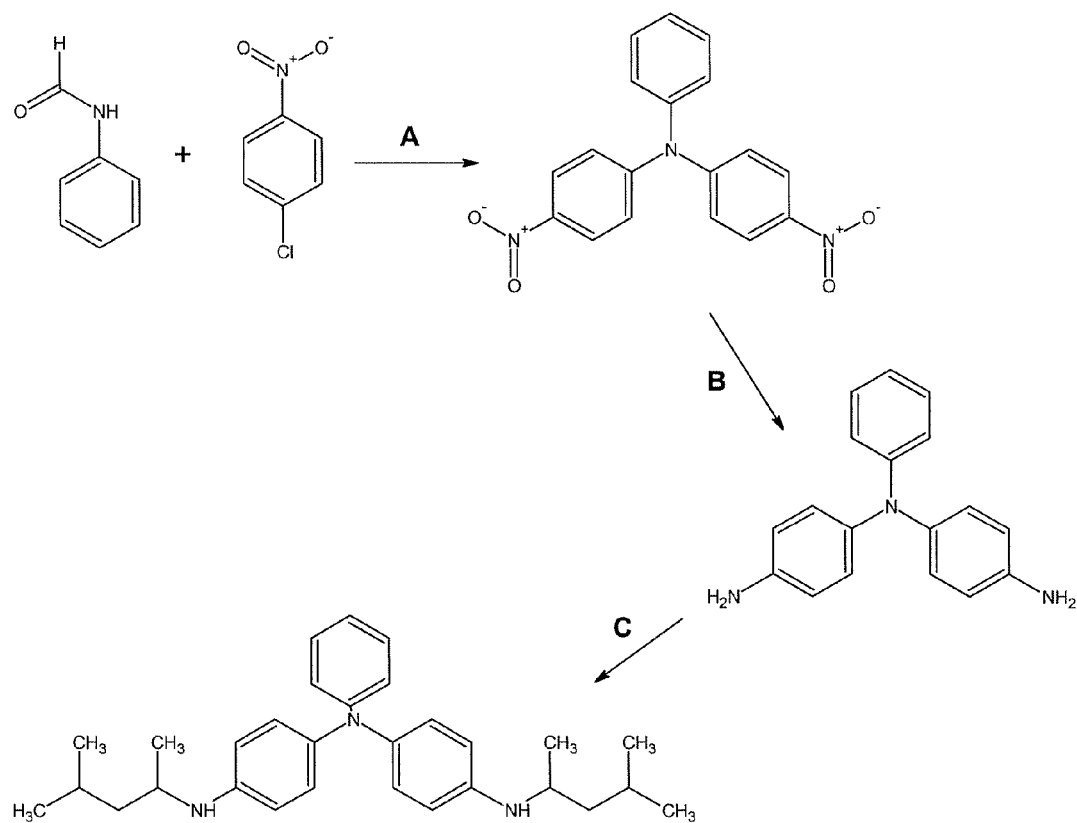

The compound of formula (III) was prepared according to the synthetic scheme indicated in FIG. 2, being inspired, in particular, by the known synthetic process described in the aforementioned document U.S. Pat. No. 3,277,174 (Example 7).

In greater detail, it was carried out in three steps (A, B and C) as follows.

A) Preparation of 4,4'-dinitrotriphenylamine

Added to a 2-liter three-necked flask equipped with a thermometer, a stirrer and a Dean-Stark trap filled with benzene, were 121 g (1 mol) of formanilide, 314 g (2.5 mol) of nitrochlorobenzene, 220 g (1.6 mol) of $K_2CO_3$ in 115 ml of DMF and 5 ml of benzene. The medium was heated at 165-175° C. for 21 hours with a permanent extraction of the water formed. The reaction was cooled and stopped with 1 liter of water. The precipitate was filtered, put into suspension with dilute hydrochloric acid, then filtered and again put into suspension in hot ethanol. The suspension thus obtained was filtered to obtain 242 g (72% yield) of 4,4'-dinitrotriphenylamine.

B) Preparation of 4,4'-diaminotriphenylamine

In order to obtain the 4,4'-diaminotriphenylamine, a reduction of the preceding compound was then carried out by hydrogenation in isopropanol at 100° C., under around 20 bar of $H_2$ pressure and in the presence of a palladium catalyst (on charcoal).

C) Synthesis of 4,4'-bis(1,3-dimethylbutylamino)triphenylamine

Next, the following were placed in a reactor: 85 g (i.e. 0.3 mol) of the preceding 4,4'-diaminotriphenylamine, 400 ml (i.e. 3 mol) of 4-methylpentan-2-one (or MIBK) in the presence of 2 g of Pd (5 wt % on charcoal), under around 25 bar of $H_2$ pressure, for 1 h 45 min at 100-130° C., then 2 h 30 min at 130-135° C. The catalyst was separated by filtration and the excess MIBK was removed by distillation. The residue (yield equal to around 92%) was purified by chromatography over alumina. The product was recrystallized in ethanol. The compound of formula (III) was thus obtained with a total yield of around 66%.

III-2. Preparation of the Rubber Compositions

The tests below were carried out in the following manner: introduced into an internal mixer, filled to 70% and of which the initial chamber temperature was around 60° C., were the isoprene elastomer, the reinforcing filler (carbon black), then, after kneading for one to two minutes, the various other ingredients, including the compound of formula (III) but excluding the vulcanization system. Next a thermomechanical working stage (non-productive stage) was carried out in one or two steps (total kneading time equal, for example, to around 7 min), until a maximum "dropping" temperature of around 165-170° C. was reached. The mixture thus obtained was recovered, cooled, then the vulcanization system (sulphur and primary sulphenamide accelerator) was added in an external mixer (homo-finisher) at 30° C., by mixing everything (productive phase) for example for 3 to 10 min.

The compositions thus obtained were then either extruded in the form of sheets (thickness of 2 to 3 mm) in order to measure their physical or mechanical properties, or calendered to produce a metallic cord fabric forming a belt layer ("working" layer) of a heavy vehicle tyre.

III-3. Characterization Tests

The objective of this test was to demonstrate the improved endurance properties of an isoprene composition for a tyre belt, when it comprises an antioxidant according to the formula (I) in comparison to a control rubber composition using a conventional antioxidant (6-PPD).

For this, two compositions based on natural rubber were prepared:

composition denoted by C-1 (control); and composition denoted by C-2 (according to the invention).

These two compositions, having formulations that were vigorously identical apart from the nature and the weight concentration of antioxidant, were intended to constitute the "calendering gum" of working layers of a belt for a heavy vehicle tyre.

Tables 1 and 2 give the formulation of the two compositions (Table 1—contents of the various products expressed in phr), their properties before and after curing (60 min at 140° C.). The vulcanization system was composed of sulphur and sulphenamide. In these compositions C-1 and C-2, the two antioxidants were used at a substantially isomolar content, that is to say that, whichever composition was tested, the same number of moles of active functional groups (secondary amines) was used; this explains the difference in the weight content of product (expressed in phr).

It is recalled here that the compound 6-PPD, reference antioxidant in the rubber compositions for tyres, especially in the belts of the latter, has the expanded formula:

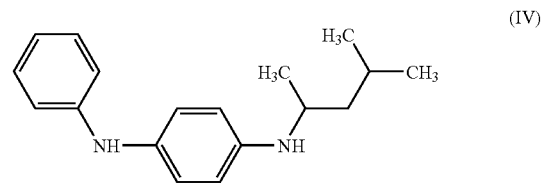 [SMILES: CC(C)CC(C)Nc1ccc(Nc2ccccc2)cc1]

For comparison, it is possible to repeat below the formula (III) of the 4,4'-bis(1,3-dimethylbutylamino)-triphenylamine used in the composition C-2:

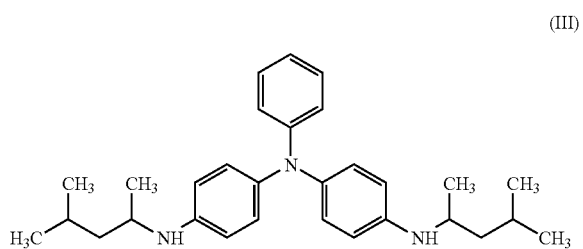 [SMILES: CC(C)CC(C)Nc1ccc(N(c2ccccc2)c2ccc(NC(C)CC(C)C)cc2)cc1]

It can immediately be noted that the second molecule has a significantly greater steric hindrance and therefore a reduced ability to diffuse, which, for a person skilled in the art, is, a priori, unfavourable to an effective antifatigue protection.

On examining the results from Table 2, it is first noted that the two compositions tested have, before ageing, identical rubbery properties, both as regards the properties before curing (Mooney viscosity and rheology properties) and after curing (mechanical properties in extension). This is already an indicator that the antioxidant of the composition of the invention, before ageing of the composition, performs as well as the reference antioxidant of the control composition.

It is only after an accelerated heat ageing, through the MFTRA measurement (base 100 reserved for the control composition C-1), that a very substantially improved endurance (gain of nearly 50%) is unexpectedly observed in the composition according to the invention, an improvement which can only be attributed to the use of the compound of formula (III).

This result allows a person skilled in the art to anticipate a high endurance of the belts and tyres according to the invention, in particular with regard to the problem of separation of the ends of the crown plies ("cleavage") mentioned previously.

TABLE 1

| Composition No. | C-1 | C-2 |
| --- | --- | --- |
| NR (1) | 100 | 100 |
| Carbon black (2) | 50 | 50 |
| Antioxidant (3) | 2.0 | — |
| Antioxidant (4) | — | 3.3 |
| ZnO (5) | 4 | 4 |
| Stearic acid (6) | 2.5 | 2.5 |
| Sulphur | 4 | 4 |
| Accelerator (7) | 1 | 1 |

(1) Natural rubber;
(2) Carbon black N330 (ASTM grade);
(3) N-1,3-dimethylbutyl-N-phenyl-para-phenylene-diamine (SANTOFLEX 6-PPD from Flexsys);
(4) 4,4'-bis(1,3-dimethylbutylamino)triphenyl-amine;
(5) Zinc oxide (industrial grade - Umicore);
(6) Stearin (PRISTERENE 4931 - Uniqema); and
(7) N-dicyclohexyl-2-benzothiazyl sulphenamide (SANTOCURE DCBS from Flexsys).

TABLE 2

| Composition No. | C-1 | C-2 |
| --- | --- | --- |
| Properties before curing | | |
| Mooney (MU) | 60 | 61 |
| $t_i$ (min) | 3.0 | 3.2 |
| $t_{99}$ (min) | 17.0 | 17.3 |
| $t_{99} - t_i$ (min) | 13.9 | 14.2 |
| K (min$^{-1}$) | 0.330 | 0.325 |
| Properties after curing | | |
| E10 (MPa) | 6.8 | 8.7 |
| E100 (MPa) | 7.4 | 7.6 |
| E300 (MPa) | 18.0 | 18.0 |
| Tensile strength (MPa) | 28 | 28 |
| Elongation at break (%) | 348 | 342 |
| Properties after ageing | | |
| MFTRA fatigue (r.u.) | 100 | 148 |

The invention claimed is:

1. A tire belt comprising a rubber composition based on at least one isoprene elastomer, a reinforcing filler, a crosslinking system and an antioxidant agent, wherein said antioxidant agent comprises a 4,4'-bis(alkylamino)triphenylamine corresponding to the formula (I):

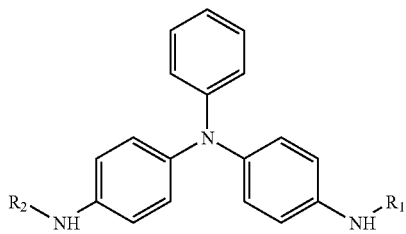

(I)

in which $R_1$ and $R_2$, which are identical or different, each represent a linear or branched alkyl group having from 2 to 8 carbon atoms or a cycloalkyl group having from 5 to 8 carbon atoms;
wherein said antioxidant agent is present in an amount between 1 and 10 phr.

2. The tire belt according to claim 1, wherein the $R_1$ and $R_2$ radicals, which are identical or different, each represent an alkyl group chosen from the group composed of isopropyl, 1,3-dimethylbutyl and 1,4-dimethylpentyl.

3. The tire belt according to claim 2, wherein the antioxidant agent is 4,4'-bis(isopropylamino)triphenylamine corresponding to the formula (III-a):

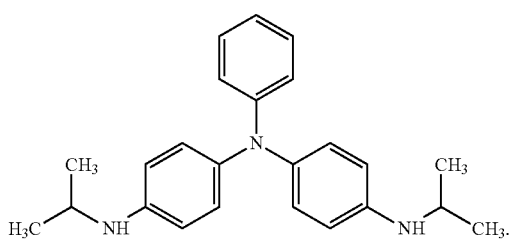

(III-a)

4. The tire belt according to claim 2, the antioxidant agent being 4,4'-bis(1,3-dimethylbutylamino)triphenylamine corresponding to the formula (III-b):

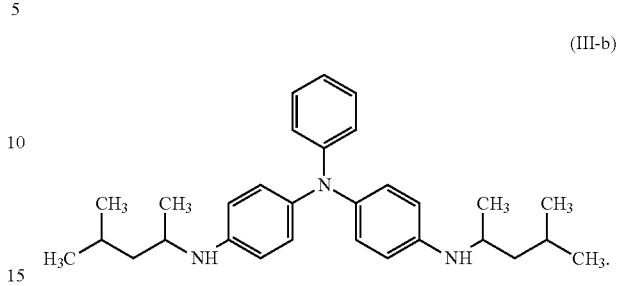

(III-b)

5. The tire belt according to claim 2, wherein the antioxidant agent is 4,4'-bis(1,4-dimethylpentylamino)triphenylamine corresponding to the formula (III-c):

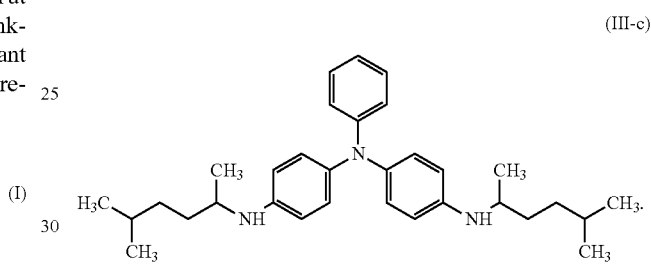

(III-c)

6. The tire belt according to claim 1, wherein the content of antioxidant agent is between 2 and 8 phr.

7. The tire belt according to claim 1, wherein the at least one isoprene elastomer is chosen from the group composed of natural rubber, synthetic cis-1,4-polyisoprenes and blends of these elastomers.

8. The tire belt according to claim 7, wherein the at least one isoprene elastomer is natural rubber.

9. A method for providing anti-ageing protection to a tire belt, comprising incorporating into a rubber composition of said tire belt an antioxidant agent comprising a 4,4'-bis(alkylamino)triphenylamine corresponding to the formula (I):

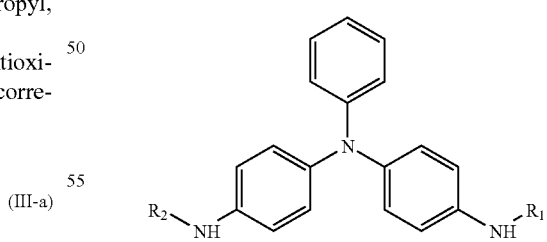

wherein $R_1$ and $R_2$, which are identical or different, each represent a linear or branched alkyl group having from 2 to 8 carbon atoms or a cycloalkyl group having from 5 to 8 carbon atoms;
wherein said antioxidant is present in an amount between 1 and 10 phr.

10. A method of manufacture or retreading of a tire, comprising introducing a tire belt according to claim 1.

11. A tire comprising a tire belt according to claim 1.

12. A tire according to claim 11, wherein the tire is a heavy vehicle tyre.

13. A process for preparing a tire belt comprising a rubber composition based on at least one isoprene elastomer, a reinforcing filler, a crosslinking system and an antioxidant agent, comprising:
    incorporating into an isoprene elastomer, in a mixer:
        a reinforcing filler; and
        an antioxidant agent,
    by thermomechanically kneading the entire mixture, in one or more stages, until a maximum temperature between 110° C. and 190° C. is reached;
    cooling the entire mixture to a temperature below 100° C.;
    then incorporating a crosslinking system;
    kneading the entire mixture up to a maximum temperature below 110° C.;
    calendering or extruding the composition thus obtained in the form of a layer of rubber; and
    incorporating this layer, after optional addition of textile or metallic reinforcements, into a tire belt,
    wherein said antioxidant agent comprises a 4,4'-bis(alkylamino)triphenylamine corresponding to the formula (I):

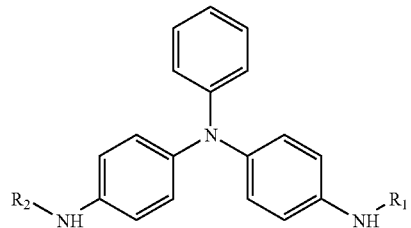

wherein $R_1$ and $R_2$, which are identical or different, each represent a linear or branched alkyl group having from 2 to 8 carbon atoms or a cycloalkyl group having from 5 to 8 carbon atoms and is present in an amount between 1 and 10 phr.

14. The tire belt according to claim 1, wherein the content of antioxidant is between 2 and 6 phr.

15. The tire belt according to claim 4, wherein the content of antioxidant is 3.3 phr.

16. The tire belt according to claim 4, wherein the content of antioxidant is between 2 and 6 phr.

17. The tire belt according to claim 4, wherein the content of antioxidant is 3.3 phr.

18. The tire belt according to claim 2, wherein one of the $R_1$ and $R_2$ radicals is 1,3-dimethylbutyl.

* * * * *